Oct. 28, 1958

G. O. BURR 2,858,449

RADIOACTIVE MEANS AND TECHNIQUE FOR
INTEGRATING VARIABLE QUANTITIES

Filed July 20, 1953

GEORGE OSWALD BURR
INVENTOR.

BY Lyon & Lyon

ATTORNEYS

United States Patent Office 2,858,449
Patented Oct. 28, 1958

2,858,449

RADIOACTIVE MEANS AND TECHNIQUE FOR INTEGRATING VARIABLE QUANTITIES

George Oswald Burr, Honolulu, Oahu, Territory of Hawaii, assignor, by mesne assignments to Hawaiian Development Company, Ltd., Honolulu, Oahu, Territory of Hawaii, a corporation of the Territory of Hawaii Application July 20, 1953, Serial No. 369,020

3 Claims. (Cl. 250—83.6)

The present invention relates to means and techniques for obtaining an integration of a variable quantity or variable condition, such integration being useful to obtain the mean value of such quantity or condition during a given period of time in which such quantity or condition varies.

The quantity or condition may, for example, be temperature, light intensity, humidity, rate of flow or any other like quantity for which an indicating meter is made. The present invention is described in relationship to an indicating meter which serves to indicate light intensity, but, of course, the present invention is not limited to this specific use but may be used to produce an integration of any other condition of the character mentioned above for which an indicating meter is made.

The present invention involves a meter which serves to indicate the instantaneous magnitude or intensity of the condition or quantity, such meter having a movable pointer or indicating hand which has a radioactive material on such pointer or indicating hand. An ion chamber is placed in proximity to such pointer or indicating hand, but such ion chamber is influenced in different degrees depending upon the displacement of such pointer or indicating hand. For this purpose, a suitably apertured lead plate is interposed between the pointer and the ion chamber with the apertured portion allowing different amounts of radiation from the pointer to impinge on the ion chamber depending upon the particular displacement of the pointer or indicating hand. Since the ion chamber retains its charged condition over a relatively long period of time, the quantity or intensity of such charge serves as a measure of the integration of the condition or quantity being measured in an instantaneous manner by the meter. Instead of using an ion chamber as the integrating means, the ion chamber, if desired, may be replaced by a Geiger-Müller counter, the output of which is fed into a scaling circuit having register.

It is, therefore, a general object of the present invention to provide improved means and techniques for accomplishing the results indicated above.

A specific object of the present invention is to provide means and techniques whereby any condition or quantity measurable by a meter having a pointer or indicating hand, may be integrated whereby a mean or average value of such condition or quantity is obtainable.

Another specific object of the present invention is to provide means and techniques of this character in which a meter pointer is coated with a radioactive material and such radioactive material influences a device such as a Geiger-Müller counter or ion chamber in a degree depending upon the particular angular displacement of such pointer or indicating hand.

Another specific object of the present invention is to provide means and techniques of this character which involve the use of a suitably and specially apertured lead plate, or other radiation barrier, interposed between a movable element responsive to the magnitude of value of a condition, and a radioactive responsive means such as a Geiger-Müller counter or ion chamber.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

For purposes of illustration, the invention is disclosed herein in a device for integrating the intensity or magnitude of light, and it is understood, of course, that as explained above, other conditions or quantities may be integrated.

Figure 1:
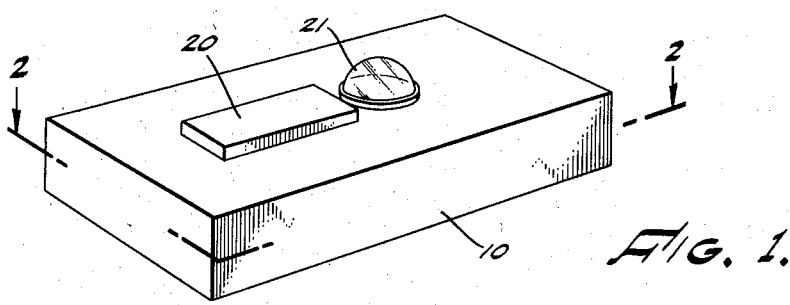
Figure 1 is a perspective view showing a device, in this instance, a light intensity device, embodying features of the present invention.
Figure 2:
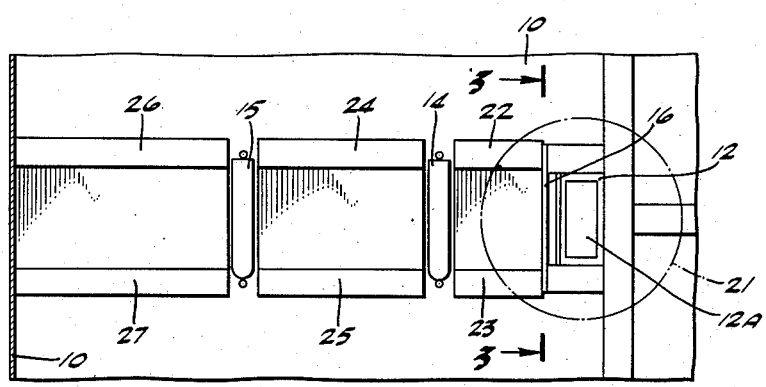
Figure 2 is a view taken generally as indicated by the line 2—2 in Figure 1.
Figure 4:
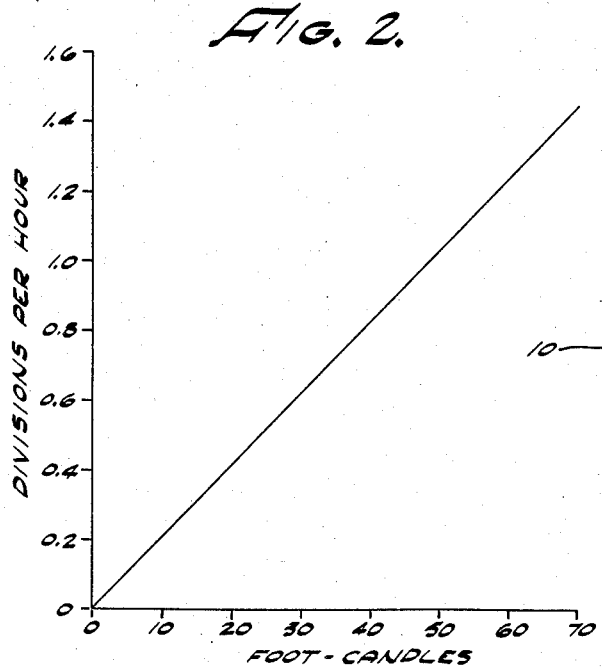
Figure 4 is a graph representing the manner in which the radiation impinging on the ion chamber in the arrangement illustrated in Figure 1 increases with an increase in light intensity.
Figure 3:
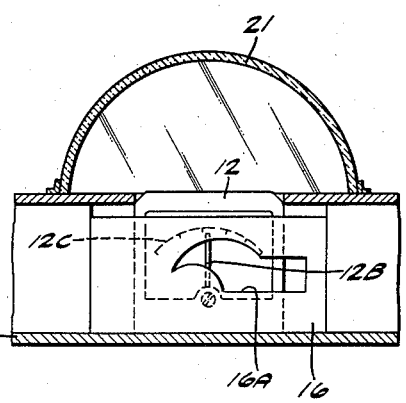
Figure 3 is a sectional view taken generally on the line indicated at 3—3 in Figure 2.

The device shown in Figure 1 is generally a rectangularly shaped box 10 which contains a light meter 12 and a pair of replaceable ion chambers 14 and 15. A lead plate 16 is interposed between, on the one hand, the light meter 12, and on the other hand, the first ion chamber 14. This lead plate 16 has an apertured portion 16A as shown in Figure 3 of predetermined size and shape as described more fully hereinafter.

A lid 20 is placed on the box 10 so that convenient access may be had to either one of the two ion chambers 14 and 15.

Also mounted on the box 10 is the light transparent dome-shaped filter 21 through which light may pass and impinge on the light receiving surface 12A of the light intensity meter 12. It is this light which is transmitted through the shield 21 which is measured by the meter 12. The instantaneous intensity of such light is indicated in conventional manner by the movable pointer or indicating hand 12B of the meter cooperating with the stationary scale 12C. It is understood that this pointer 12B, as is conventional, pivots an angular amount dependent upon the intensity of the light impinging on the light receiving surface 12A.

In accordance with an important feature of the present invention, the pointer 12B is coated uniformly, along its length, with a radioactive material such as a small amount of radioactive strontium (Sr 90). Thus, each unit of length of the pointer 12B emits an arbitrary unit of rays, for example, beta rays.

The lead plate 16 is so apertured that with each unit change in light intensity there is a corresponding change in the beta rays passing through such aperture and impinging on the ion chamber 14. The charged condition of the ion chamber 14 thus is representative of an accumulated or integrated effect. The ion chamber 14 may be a so-called dosimeter or a so-called pocket chamber having a range of 200 mr.

The apertured portion of the lead plate 16 is so designed that no radioactive radiation passes through the apertured portion 16A when the light meter reads zero, i. e., in darkness. With each incremental change in light intensity, the pointer 12B moves a corresponding incremental angular distance where an increased length of the pointer 12B is exposed to the ion chamber 14. This change in exposure of the pointer 12B is gradual, being substantially zero when the light meter reads zero and being substantially the full length of the pointer 12B in a full scale reading of the meter 12.

Instead of being apertured, as shown, the plate 16 may have a non-uniform thickness so as to produce the same result indicated above, the lead plate 16, in such case, being so gradated in thickness that more and more beta rays penetrate such plate the greater the deflection of the pointer 12B.

It is noted that the ion chamber 14 is mounted in a replaceable manner, a convenient distance from the light meter 12, such distance being established by the lengths of the stationary spacers 22 and 23 which cooperate with the spacers 24 and 25 in providing a receptacle for the ion chamber 14. This receptacle so defined, may be provided with V-shaped grooves cooperating with the ion chamber 14 to accurately locate the same. The second ion chamber 15 is spaced by the spacers 24 and 25 which cooperate with the spacers 26 and 27 to provide a like receptacle for such ion chamber 15. The ion chamber 14 is used to obtain daily readings whereas the more remotely located ion chamber 15 is used to obtain weekly readings. Since these ion chambers 14 and 15 have a leakage of only approximately 1% full scale per day, several weeks or a month may elapse between readings, should the strontium radiation be reduced. This reduction in radiation may be accomplished by using conventional thin filters.

It is apparent that integrated light values over very short periods of time may be obtained by using either more sensitive receiving instruments, such as ion chambers, or Geiger-Müller counters with scaling circuits or by increasing the strength of the radioactive source which is coated on the indicating pointer 12B.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A converting and integrating device for converting and integrating instantaneous meter readings of instantaneous conditions to readings of average conditions corresponding to said instantaneous conditions, comprising, in combination, a meter having a pivoted pointer which is uniformly coated along its entire length with radioactive material and which is displaced an amount proportional to the instantaneous condition being measured by said meter, storage means responsive to said radioactive material and producing an accumulated effect in response thereto, and shield means interposed between said radioactive material and the last mentioned storage means for changing the amount of radioactive radiation impinging on the last mentioned means in accordance with the position of said pointer, said shield means comprising generally a plate having its plane extending perpendicular to the axis of pivotal movement of said pointer, said plate having an apertured portion which is transparent to the radiation from said pointer and which is progressively larger in the direction of pivotal movement of said pointer so as to allow greater amounts of radiation to impinge on said storage means in accordance with greater deflections of said pivoted pointer.

2. A converting and integrating device for converting and integrating instantaneous meter readings of instantaneous conditions to readings of average conditions corresponding to said instantaneous conditions, comprising, in combination, a meter having a pivoted element which is movable instantaneously in accordance with instantaneous conditions, said element being uniformly coated along its entire length with radioactive material, storage means responsive to the radiation from said radioactive material, a radiation opaque means interposed between said element and the last mentioned storage means, and said radiation opaque means having an apertured portion which is progressively larger in the direction of pivotal movement of said element to allow greater amounts of radiation to impinge on the last mentioned storage means in accordance with greater pivotal movement of said element.

3. A converting and integrating device for converting and integrating instantaneous meter readings of instantaneous conditions to readings of average conditions corresponding to said instantaneous conditions, comprising, in combination, a meter for measuring a condition, said meter having a pointer which is movable instantaneously in accordance with instantaneous conditions, radioactive material uniformly coated along the entire length of said pointer, radiation responsive storage means spaced from said radioactive material, radiation opaque material interposed between said pointer and the last mentioned means, said material having an apertured portion which is progressively larger in the direction of movement of said pointer to allow greater amounts of radiation from said radioactive material to impinge on the last mentioned storage means in accordance with greater movement of the pointer.

References Cited in the file of this patent

UNITED STATES PATENTS

| | | |
|---|---|---|
| 2,399,061 | Rosenblum | Apr. 23, 1946 |
| 2,501,560 | Blau | Mar. 21, 1950 |
| 2,662,208 | Wells | Dec. 8, 1953 |
| 2,683,813 | Friedman | July 13, 1954 |